G. W. MARBLE.
VELOCIPEDE.
No. 185,401. Patented Dec. 19, 1876.
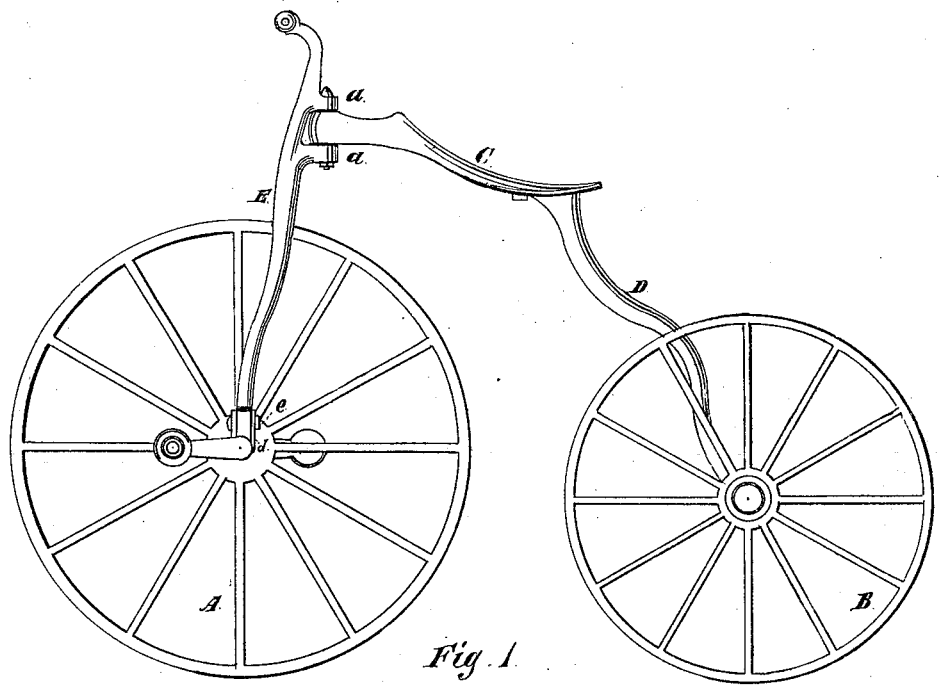
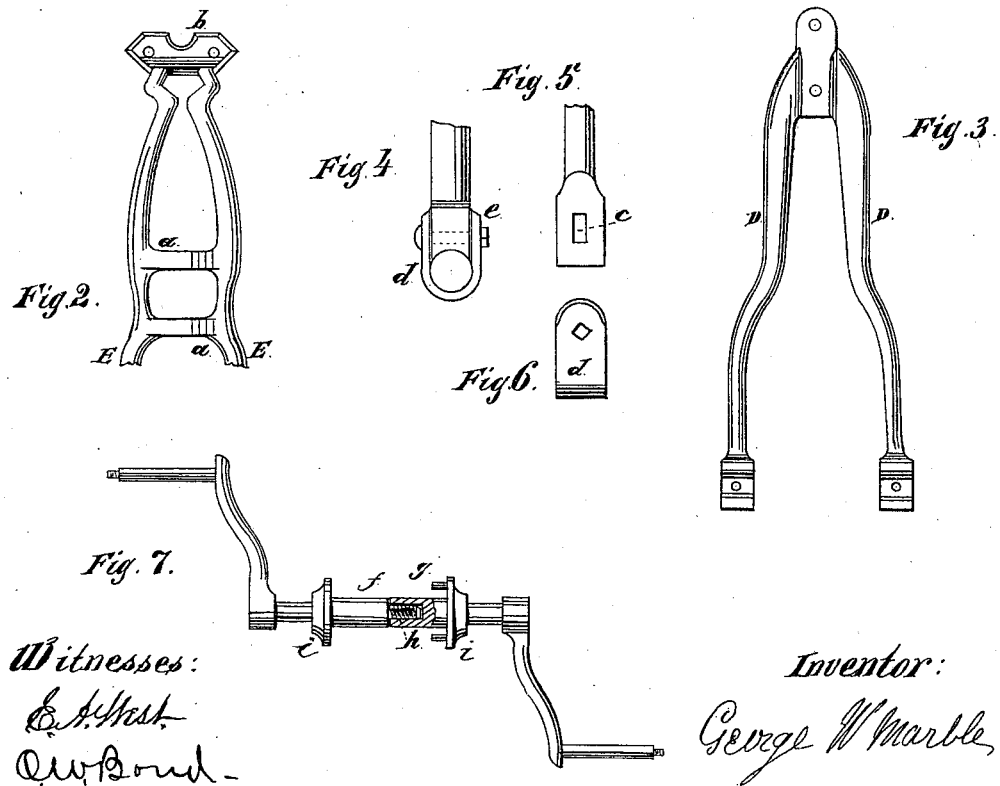
Witnesses:
E. A. West
O. W. Bond
Inventor:
George W Marble

UNITED STATES PATENT OFFICE.

GEORGE W. MARBLE, OF CHICAGO, ILLINOIS.

IMPROVEMENT IN VELOCIPEDES.

Specification forming part of Letters Patent No. 185,401, dated December 19, 1876; application filed July 24, 1876.

*To all whom it may concern:*

Be it known that I, GEORGE W. MARBLE, of the city of Chicago, Cook county, State of Illinois, have invented new and useful Improvements in Velocipedes, of which the following is a full description, reference being had to the accompanying drawings, in which—

Figure 1 is a side elevation; Fig. 2, a front view of the upper portion of the standard; Fig. 3, a plan view of the rear portion of the reach; Figs. 4, 5, and 6, details showing the method of connecting the lower end of the standard with the axle; Fig. 7, a detail showing the construction of the front axle.

My improvements are chiefly designed to be used in constructing velocipedes for children, and its objects are to simplify and cheapen the construction of velocipedes, and to so make them that they can be readily shipped in parts in a small compass; also, to so connect the standard with the front axle that compensation for wear is provided for, which I accomplish by so constructing the saddle that it forms a part of the reach, and by means of the other devices hereinafter claimed as new.

In the drawings, A represents the forward wheel and B one of the rear wheels. The reach is made of metal, in two parts, C D, secured together by bolts and nuts, or in other suitable manner. The part C is shaped so that it forms the saddle, and the front end is extended forward and pivoted at $a$ to the standard. The part D of the reach is forked and the ends secured to the rear axle in the usual manner. E is the standard. It is made of metal, and consists of a single piece, the two upright portions being connected by the parts $a\ a$ and also at the top by $b$, to which part $b$ the handle is secured. The lower end of each arm of the standard E is grooved to receive the axle, and is provided with a slot, $c$. $d$ is a strap, which passes around the axle, and is secured to the standard by means of a bolt and nut, $e$, which bolt passes through the slot $c$. By this arrangement the strap $d$ can be adjusted as may be necessary, in consequence of wear. The front axle is made of two parts, $f\ g$, held together within the hub by means of a male and female screw, $h$, as shown in Fig. 7. The cranks are cast one upon or with each part of the axle. Upon each portion $f\ g$ of the axle is cast a fixed collar, $i$. As represented, one of these collars is provided with two pins, to be inserted into the hub, while the other is to be secured to the hub by screws, by which means it will be impossible for the axle to come apart, whether the motion be forward or backward. By making the saddle so that it forms a portion of the reach, I am able to use a larger front wheel, without increasing the distance from the center to the saddle, than when an independent reach is used upon which the saddle is placed.

I have shown a three-wheeled velocipede; but it is evident that my improvements can be applied to one with two wheels, placing the rear wheel between the forks of the rear portion of the reach. By removing the saddle from the remaining portion of the reach, the entire velocipede can be packed in a box the diameter of which is equal to the diameter of the front wheel, thus making a very compact package for shipment.

Velocipedes made as described will have the requisite strength, but will be light, and can be made at less cost than heretofore.

What I claim as new, and desire to secure by Letters Patent, is as follows—

1. In a velocipede, a reach consisting of two parts, C D, one part, C, so made as to form the saddle, substantially as specified.

2. The standard E, provided with the slots $c$ at the lower ends, in combination with the straps $d$, substantially as specified.

GEORGE W. MARBLE.

Witnesses:
E. A. WEST,
O. W. BOND.